United States Patent
Sauer et al.

(10) Patent No.: US 7,221,933 B2
(45) Date of Patent: May 22, 2007

(54) MESSAGING SYSTEM FOR MOBILE COMMUNICATION

(75) Inventors: David Sauer, San Diego, CA (US); Diego Kaplan, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 895 days.

(21) Appl. No.: 10/037,116

(22) Filed: Oct. 22, 2001

(65) Prior Publication Data
US 2003/0078033 A1    Apr. 24, 2003

(51) Int. Cl.
H04L 12/58    (2006.01)
H04M 1/725    (2006.01)
H04Q 7/22    (2006.01)

(52) U.S. Cl. ............... 455/412.1; 455/412.2; 704/1; 704/2; 704/7; 704/9

(58) Field of Classification Search ............ 455/412.2
See application file for complete search history.

(56) References Cited

U.S. PATENT DOCUMENTS

| | | | | |
|---|---|---|---|---|
| 5,663,715 | A * | 9/1997 | Godoroia | 340/825.2 |
| 5,845,203 | A | 12/1998 | LaDue | 455/414 |
| 6,185,208 | B1 | 2/2001 | Liao | 370/392 |
| 6,397,079 | B1 * | 5/2002 | Shimoda et al. | 455/557 |
| 6,768,789 | B1 * | 7/2004 | Wilk | 379/67.1 |
| 6,956,831 | B1 * | 10/2005 | Mahr | 370/310 |
| 2001/0011020 | A1 | 8/2001 | Nahm | |
| 2001/0013037 | A1 | 8/2001 | Matsumoto | |
| 2001/0023187 | A1 | 9/2001 | Wilhelm | |
| 2001/0028709 | A1 * | 10/2001 | Makela et al. | 379/214.01 |
| 2001/0029455 | A1 | 10/2001 | Chin et al. | |
| 2001/0032240 | A1 | 10/2001 | Malone et al. | |
| 2001/0034224 | A1 | 10/2001 | McDowell et al. | |
| 2001/0034225 | A1 | 10/2001 | Gupte et al. | |
| 2001/0034767 | A1 | 10/2001 | Aho | |
| 2002/0116499 | A1 * | 8/2002 | Enns et al. | 709/227 |

* cited by examiner

Primary Examiner—Duc M. Nguyen
Assistant Examiner—Matthew Genack

(57) ABSTRACT

A system and method for communicating messages between mobile communication devices. Predefined and customizable messages are provided to the user for selection and transmittal. Customizable messages include customizable text entry portions for text, default information such as the date or time, or defined information previously input and saved in memory by the user. Each predefined message can be translated into another language for transmission to one or more recipients. Acoustic messages can also be recorded and transmitted to one or more recipients. Messages are transmitted by conventional means over radio frequencies, infrared, or cable connections. In a second embodiment messages and translations are transmitted by code to a central server which decodes and transmits the message to each recipient mobile. In a third embodiment, all mobiles in the communication system are programmed to contain identical predefined and customizable messages and messages are transmitted by code.

25 Claims, 5 Drawing Sheets

MESSAGING SYSTEM FOR MOBILE COMMUNICATION

BACKGROUND OF THE INVENTION

1. Field of the Invention (Technical Field)

The present invention relates to a messaging system to improve message transmission efficiency, speed, and accuracy from a mobile communication device.

2. Background Art

There are a variety of mobile communication devices available for wireless, or remote, communications, such as mobile telephones and pagers, hereinafter referred to as "mobiles". Mobiles typically comprise a rigid housing enclosing a printed circuit board, an associated microprocessor, electronic and electro-acoustic components, and a portable power supply such as a battery. Mobiles communicate through a variety of means, including antennas which transmit and receive radio frequency (RF) signals, infrared (IR) emitters and receivers, and cable connections to input/output ports on computers or to other mobiles. The user interfaces with the circuitry and microprocessor of the mobile through a keypad, or touchpad, located on the front outer surface of the housing. Keys on the keypad are pressed by the user to temporarily close an internal switch and send a signal to the microprocessor of the mobile where an appropriate routine processes the input and activates the mobile. On mobile telephones, graphical elements, such as alphanumeric characters and icons, are located on or near the keys of the keypad to guide the user in interfacing with the mobile. For example, keys are identified with the numbers 0–9, letters of the alphabet, and the pound and asterisk symbols. A display on the mobile housing provides readouts of data input by the user, access to spatially-navigated menu trees, graphical user interfaces (GUIs), windows, and messaging.

As mobile designs have advanced, more features are provided to the user, such as the ability to program, store and transmit information to other mobiles, computers, servers, and over the Internet. Typically, spatially-navigated menus shown on the display aid the user in inputting data, and also aid the user in accessing data for revision or transmission. To make use of these features requires an increasing number of keystrokes and more detailed information on the display for the user to interface with the mobile. On mobile telephones specifically, more features have led to the need for more keys. As the number of keys on the keypad of mobile telephones has increased, the density of the keys within a given surface area has increased and the size of each key has decreased. Key spacing is further compromised as mobiles are made more compact to reduce weight and improve portability.

Due to the size of mobiles and the limited amount of key space on such devices, it is often difficult to enter data or text messages into a mobile in an efficient manner. For example, to enter a textual message on a mobile telephone, the user typically accesses the appropriate message menu offered in the menu hierarchy and then keys in the textual data by pressing the alphanumeric keys of the keypad. Often, the key must be pressed more than once to input the correct letter as one key may represent as many as three letters. For example, the same key may represent the number "2" as well as the three letters "A," "B," and "C." Further, most mobile telephones limit the number of characters per message, requiring the user to express the message as succinctly as possible. The increased number of functions performed by each key, and the limited number of characters available per message, further contribute to the cumbersome nature of entering and transmitting a textual message. In order to increase message entry efficiency, users often resort to shorthand to relay the message, for example, "IC" may be entered to represent "I see."

To improve the efficiency of text message transmission between mobiles, a variety of "short message systems" (SMS) have been designed for rapid text entry. Early applications of SMS were used by telephone operators to alert subscribers to newly received voice mail messages or stored facsimiles by displaying a simple message on the mobile display that the user saw once the mobile was turned on. Later applications of SMS provide users with a list of default messages that are chosen by a single keystroke in order to be sent, for example, "please call home." Upon choosing the predefined message, the sending mobile automatically sends it to the receiving mobile. Short message systems have been implemented for the transmission of messages from the Internet, computers, and from messaging services of communication service providers. One advantage of an SMS is that the receiving mobile need not be active in order to receive the message. The sent message is stored in the communication system until the receiving mobile is switched to the "On" position. The message is then automatically received, stored on the receiving mobile, and displayed on its screen.

Difficulties with present SMS systems include the inability to edit or revise the predefined messages stored in the system to communicate a more precise message. Another difficulty arises when the message is transmitted in a single language. With increased global communication, it would be useful if messages could be received in a selected language. Prior art systems do not provide this capability.

An efficient method of transmitting messages between users of mobiles is needed where the number of keystrokes is minimized and the ability to tailor the message is preserved. The ability to send messages in a particular language is also needed. Accordingly, there is a need to be able to customize and translate predefined messages into other languages for enhanced communication between mobile users.

SUMMARY OF THE INVENTION (DISCLOSURE OF THE INVENTION)

A primary object of the present invention is to provide a messaging system for mobiles where the user is provided predefined messages, as well as messages that can be customized. Another object of the present invention is to provide messages in a base language and the ability to transmit the messages to a receiver in a selected language. Another object of the present invention is to minimize keystrokes required to transmit a message. Still another object of the present invention is to minimize the amount of data required to transmit a message.

The present invention is a messaging system for mobiles where predefined messages can be selected and customized by the user for transmission to the receiver. The predefined messages can be customized by entering the desired text at predetermined locations within each message. The invention also provides the predefined messages in a variety of languages so that the user can select the message to be sent in a base language and request that the message be translated into another language for transmission to the receiver. The invention also allows the user to select from a contact list those recipients who are to receive the transmitted message; the mobile then transmits the message to every recipient selected from the list.

A primary advantage of the present invention is improved efficiency in message communication due to the decreased number of keystrokes required to enter the selected message into the mobile to be transmitted. Another advantage of the present invention is that predefined messages can be customized by entering text at predetermined locations within each message. Still another advantage of the invention is the ability to have the message transmitted to the receiver in a selected language. Yet another advantage of the present invention is the ability to transmit a message to a plurality of recipients. Still yet another advantage of the present invention is the ability to transmit messages with a minimal amount of data in the transmission. The present invention provides simple, fast, and accurate communications irrespective of the language used.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate preferred embodiments of the present invention and, together with the description, serve to explain the principles of the invention. The drawings are only for the purpose of illustrating preferred embodiments of the invention and are not to be construed as limiting the invention. In the drawings.

DESCRIPTION OF THE PREFERRED EMBODIMENTS (BEST MODES FOR CARRYING OUT THE INVENTION)

Figure 1:
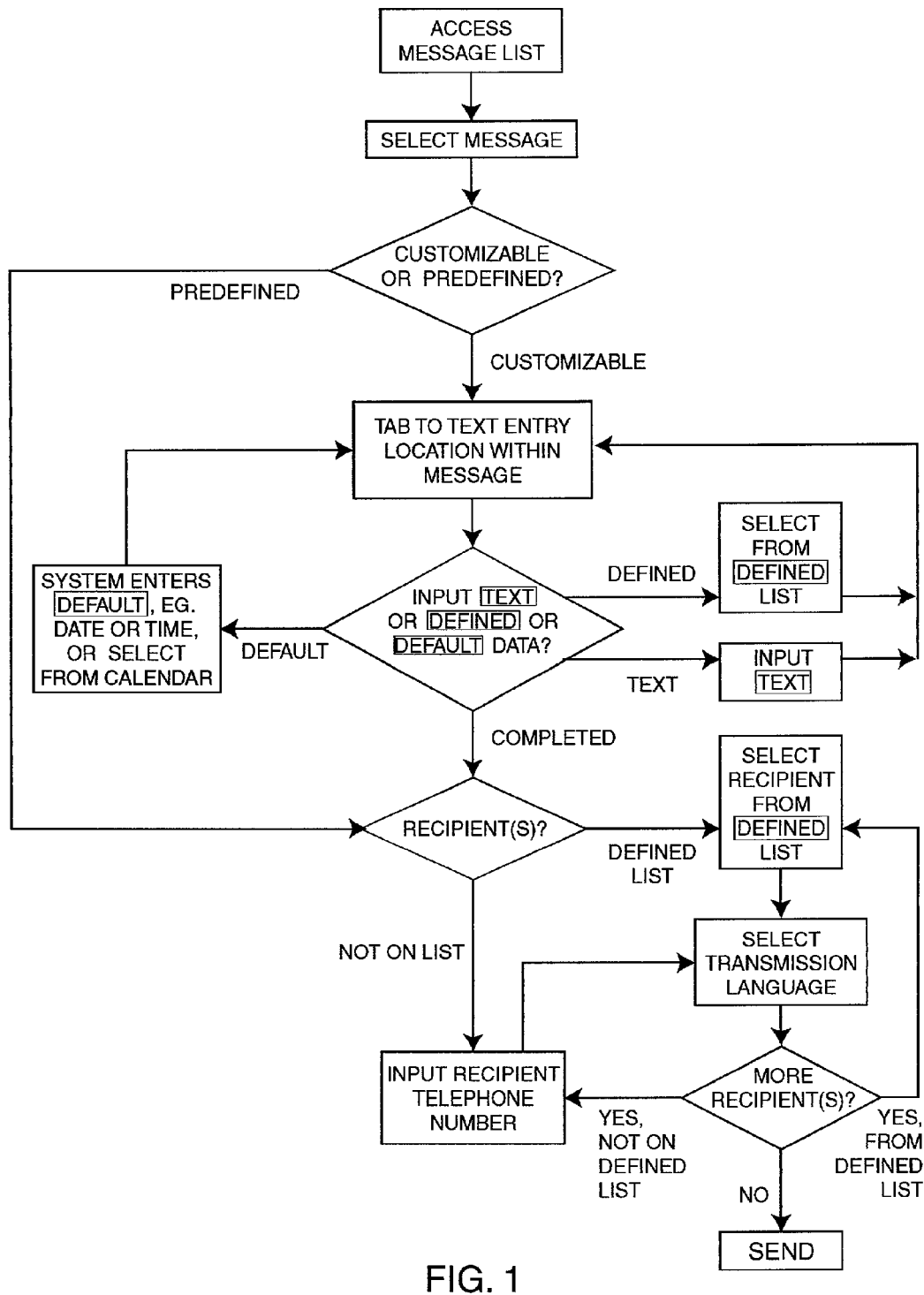
FIG. 1 is a flow diagram demonstrating the method of the preferred embodiment of the messaging system of the present invention.

Referring to FIG. 1, a flow diagram demonstrates the preferred embodiment for the messaging system of the present invention. A suitable routine operating in the microprocessor of the mobile is used to implement the methodology of the messaging system. The mobile transmitter transmits the messages. To operate the system, the user first accesses a menu of messages. To access the messages, the user proceeds through one or more windows, menus, or graphical user interface screens until arriving at the list of messages. Table 1 lists four examples of "predefined" messages accessible to the user of the messaging system. The same examples of predefined messages appear in FIG. 3, which shows examples of both predefined and customizable messages available to the user, to be described below.

TABLE 1

| Message No. | Predefined Message |
| --- | --- |
| (1) | "Are you available?" |
| (2) | "Please contact the office." |
| (3) | "Will you attend the meeting today?" |
| (4) | "Please return to the office." |

Figure 3:
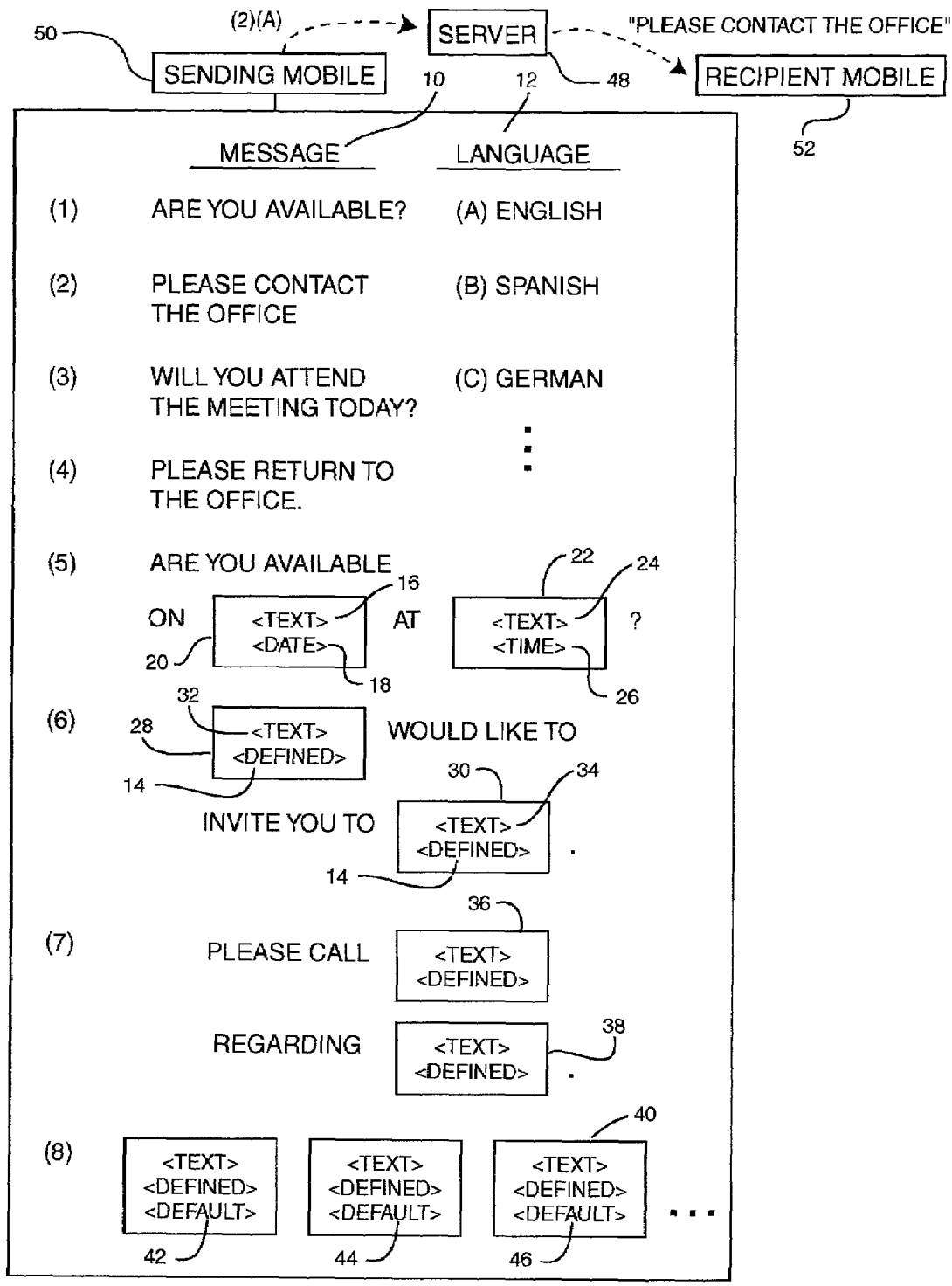
FIG. 3 is a diagram demonstrating a list of examples of predefined and customizable messages, available translation languages and the second embodiment of the transmission methodology of the present invention.

The list of predefined messages shown in Table 1, and also in FIG. 3 at 10, cannot be customized. These messages are available for rapid communication in the event that the user does not need to customize the message. Returning to FIG. 1, upon selecting the desired predefined message for transmission, such as by navigating to the desired message and selecting it through the "enter" key of the mobile, the messaging system prompts the user to select the recipient or recipients to whom the message is to be transmitted. This prompt includes the option of inputting a particular recipient for message transmission or one or more recipients from a contact list stored on the system. If the user chooses to send the message to a recipient that is not on the mobile contact list, the user inputs the telephone number of the recipient.

Each predefined message is stored in the mobile memory in a variety of languages. After entering the recipient's telephone number, the user is prompted to select a transmission language 12. (See FIG. 3.) The prompt for selecting a transmission language includes a list of available languages, such as English (A), Spanish (B), German (C), etc. The message is then transmitted in the language that was selected by the user, and the recipient mobile displays the message in the selected language to the recipient.

If the user selects the option of choosing a recipient or recipients from the contact list stored in the mobile memory, the system displays the "defined contacts/text" list 14 (see FIG. 5) and allows the user to select one or more recipients for the message. After each recipient, group list, or all contacts, is selected to receive the message, the system prompts the user to select the transmission language for that recipient, group, or all contacts. Once the user has selected all of the recipients for the message and their associated transmission language, the message is sent to all recipients. Each recipient mobile displays the message in the selected transmission language.

Figure 5:
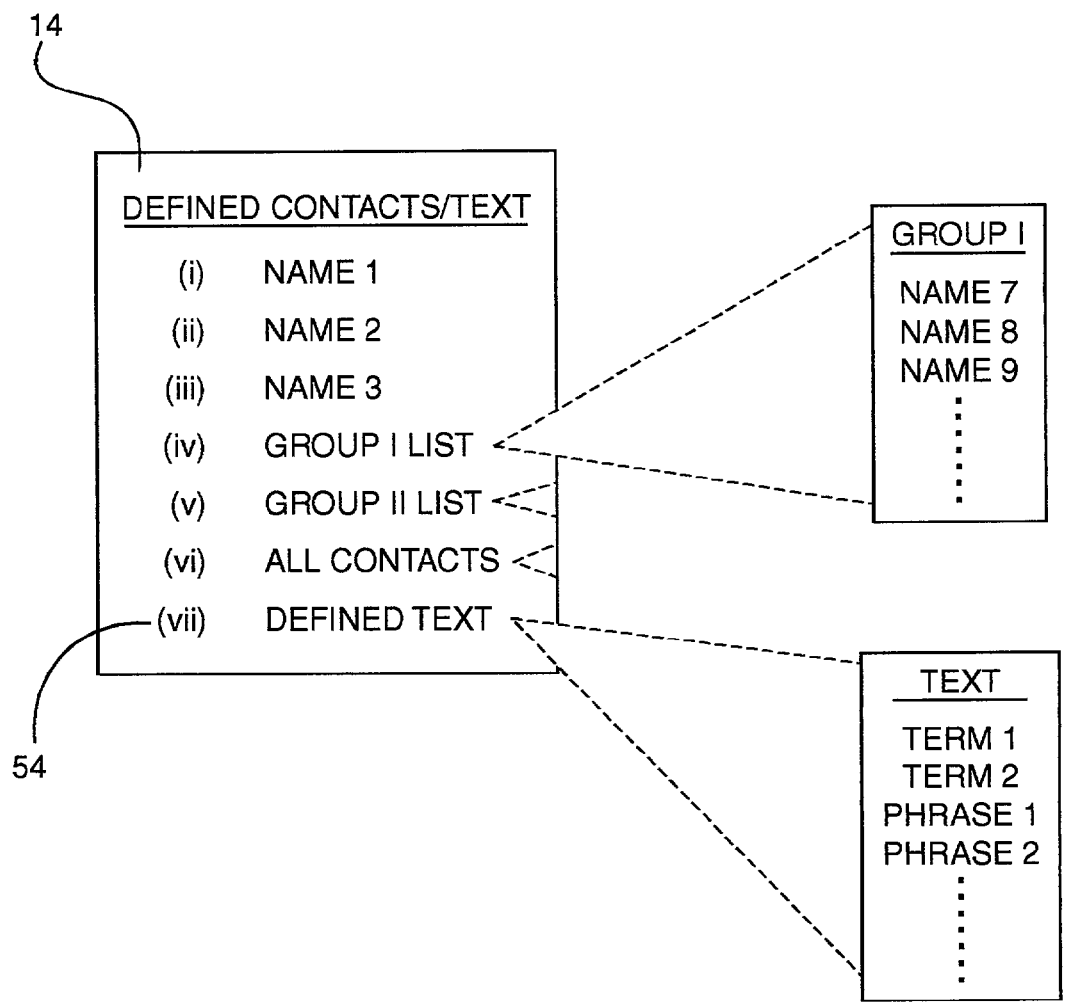
FIG. 5 is a list of examples of defined contacts/text information for use in accordance with the preferred embodiment of the present invention.

Referring to FIG. 5, the recipients' contact information is stored within list 14 which contains text, phrases, and contact information previously input by the mobile user into memory. For example, once the user chooses to select a recipient or recipients from list 14, the system displays list 14 from which the user selects a recipient or recipients. The user has a choice of selecting individual names, group lists, or all contacts stored in list 14. If the system is in the "select recipient" mode, the system automatically inputs the telephone number, or address information, associated with the selected recipient for transmission. Contacts are initially defined by the user and input into the system memory by entering the contact person's name, telephone number, address, and other relevant information into the defined contacts/text list 14 of the mobile memory.

List 14 shown in FIG. 5 includes textual data as well as contact information. The user has the option within the system to input terms and phrases into list 14 in memory for rapid recall and use within a message as will now be described. Returning to FIG. 1, the user has a choice of "customizable" messages to choose from the message list 10, in addition to the predefined messages. Table 2 provides a list of three example customizable messages made available to the user on the messaging system. (See also FIG. 3.)

TABLE 2

| Message No. | Customizable Message |
|---|---|
| (5) | "Are you available on TEXT/DATE at TEXT/TIME?" |
| (6) | "TEXT/DEFINED would like to invite you to TEXT/DEFINED." |
| (7) | "Please call TEXT/DEFINED regarding TEXT/DEFINED." |

Each customizable message available to the user contains a predefined portion and one or more customizable text entry portions. If the user chooses a customizable message, the user navigates to each customizable text entry location within the message in order to enter the customized information. There are three basic types of customized information that the user can input: (1) "text," which is input by the user one character at a time on the mobile keypad, (2) "defined," which is contact or textual information previously defined by the user and stored in defined contacts/text list 14 in memory (see FIG. 5), or (3) "default," such as the current date or time, as appropriate to the context of the message, or a date or time that the user selects from the system calendar or clock. For example, referring to FIG. 3, if the user selects customizable message No. 5, the user is first prompted to enter either textual information 16 or default information 18, such as a date or time, at the first customizable location 20 within the message. To choose "text" or "default," the user navigates, with the appropriate navigation key, to either "text" or "default" and strikes the "enter" key. If the user chooses to input text into customizable location 20, the user keys in the information one character at a time through the mobile keypad. If the user chooses to input default information 18 in the first customizable location 20 of message No. 5, the system offers the user the choice of, in this instance, the present date, or offers the user the option to select a date from the system calendar. Once customizable location 20 is completed, which is accomplished with the "enter" key, the user enters the information and the system moves to the next customizable location 22 within the message. The user is then prompted to enter either textual information 24 or default information 26 at customizable location 22. If the user chooses to input text 24, the user keys in each character of text until completed. If the user chooses to input default information 26, the system automatically offers the user a choice of times, such as 11:00 a.m., 12:00 p.m., 1:00 p.m., etc. from the system calendar.

Referring to customizable message No. 6 of Table 2 and FIG. 3, two text entry locations 28 and 30 are provided for the user to customize. Upon selecting customizable message No. 6, the user is first prompted to enter either text 32 or defined information from list 14. If the user chooses text 32, the user keys in each character of the textual information for the message. If the user chooses defined information, the system displays defined contacts/text list 14 of FIG. 5. The user then selects the defined information from list 14. For example, the user may choose to enter a contact name into text entry location 28. Alternatively, the user may choose to input a defined term or phrase that the user previously stored in list 14 in memory, for example, "Discussion Group 3." After entering the customized information into location 28 of customizable message No. 6, the user is prompted to complete entry location 30 of customizable message No. 6. The user again has the option of keying in text 34 or selecting defined information from defined contacts/text list 14. For example, if the user chooses to enter defined information, the user can select a phrase from list 14 at 54 (see FIG. 5), such as "our Thursday meetings". Because the system is in the customizable message entry mode, should the user choose a contact name or list of names for location 28 or 30, the system automatically enters only the contact name, or group name, into the entry location, and disregards the associated address and telephone information associated with that name. Customizable message No. 7 also offers two customizable locations 36 and 38 to be completed by the user in a similar manner. It will be understood that a variety of predefined and customizable messages are included within the teachings of the present invention.

Once the customizable message is complete, the system prompts the user to select a recipient or recipients to receive the message. The user then selects a recipient or recipients from the defined contacts/text list 14 (see FIG. 5), or inputs a particular recipient's telephone number. After each recipient, or group of recipients, is entered, the system prompts the user to select a transmission language for the message. The system then translates those predefined portions of the customizable message outside of the customizable locations into the selected transmission language. Default information, such as dates and times, is also translated into the selected language. Optionally, the system also includes a feature of translating individual words into other languages, and in this instance also translates as many words as possible from the customized locations, including defined information and text, into the selected transmission language. Once all of the recipients have been named and the transmission language selected for each, the customized message is sent to each recipient.

The system also enables the user to concatenate a series of text, defined, and default information into a completely customized message, as shown by message No. 8 at 40 in FIG. 3. The user is continually prompted to enter either text, defined, or default information until the message is complete. For example, the user is first prompted to enter either text, defined, or default information at entry location 42. As described above, if the user chooses to enter text information, the user keys in each individual character until complete. If the user chooses to enter defined information, the system provides the defined contacts/text list 14 (FIG. 5) from which the user can choose a name, group of names, terms, or phrases. If the user chooses default for entry location 42, then the system provides the system calendar to the user so that a date, day of the month, or time can be selected for entry. By allowing the user to concatenate message data in this manner through customizable locations 42, 44, and 46, as shown at customizable message 40, the user can input a detailed message in a rapid and efficient manner.

Figure 2:
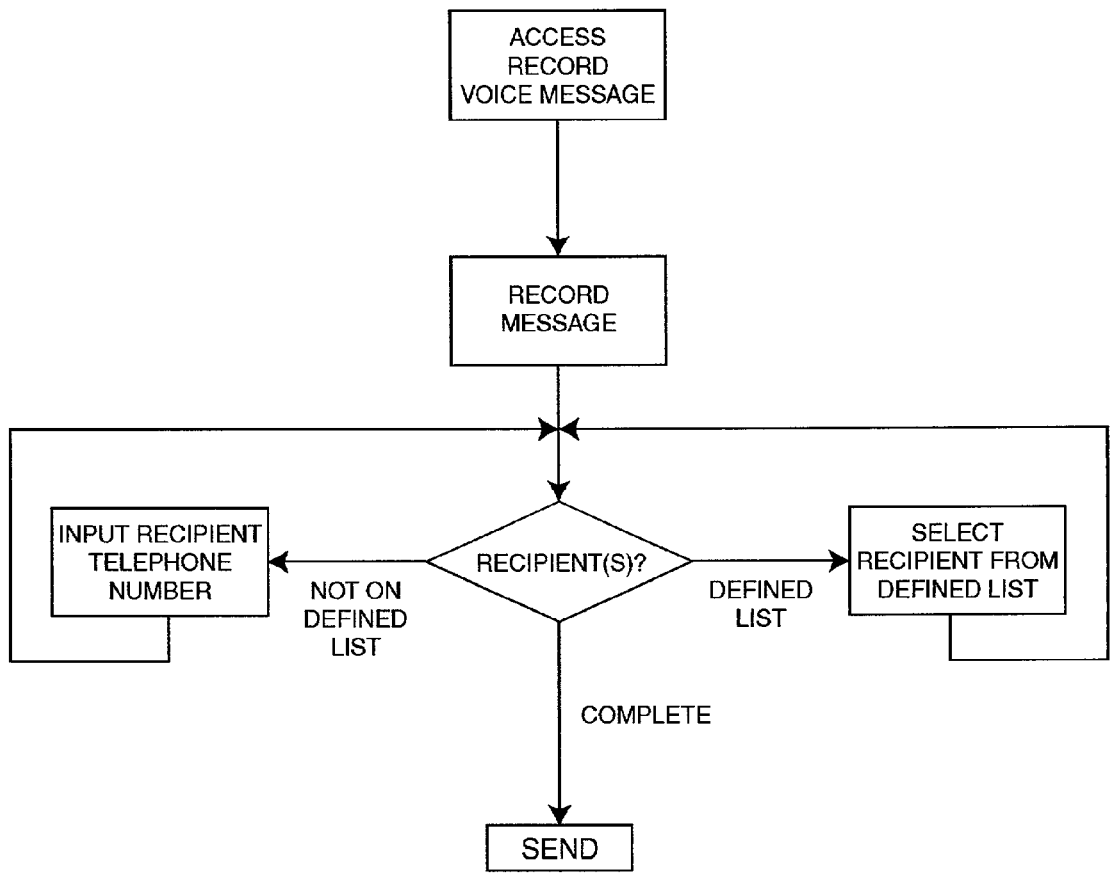
FIG. 2 is a flow diagram demonstrating the voice-recorded message feature of the messaging system of the present invention.

Referring to FIG. 2, a flow diagram depicts a recorded-voice message feature of the present invention for a system applicable in particular to mobile telephones. This feature allows a user to record a voice message, or other acoustic message, for transmission to a plurality of recipients, rather than keying in a text message. The user first accesses the record voice message feature in the mobile through a menu hierarchy, graphical user interface, or otherwise, and is then prompted by the system to record the voice message. Upon completion of the voice message, the system prompts the user to select the recipient or recipients for receiving the message. The user can either select recipients from the defined contacts/text list 14 (FIG. 5) or input a particular recipient's telephone number directly. Because the system is in the select recipients mode, the system automatically inputs the associated telephone number along with the recipient if selected from the defined contacts/text list 14. Once all recipients have been selected for receiving the recorded voice message, the message is sent by the system to all selected recipients. This feature is particularly useful for recording a message that must be sent to a large number of recipients. For example, the user may record the voice message and then select a group list of recipients from the defined contacts/text list 14, where the group list contains many recipient names and telephone numbers. This reduces to a single call the number of telephone calls that the user would make with a prior art system. The system transmits the voice message to each recipient telephone number automatically. The recipient mobile then receives an indication that a voice message has been transmitted and the recipient mobile user can then access the voice message through the recipient mobile. The user has the option of transmitting the voice message directly to the recipient's voice mail, or the user can transmit the voice message to the recipient by dialing the recipient number, and playing the recording when the recipient answers the telephone.

There are three transmission methodologies through which the messaging system can be implemented. In the first transmission embodiment, message information is transmitted over conventional communication links, such as through a cable connection, or through a wireless connection such as an encoded RF signal, or infrared signal. Message information is transmitted directly from the sending mobile to the receiver, the receiver being another mobile, a computer, a server, or the Internet.

In a second embodiment, an intermediate server 48, shown in FIG. 3, is used to decode and transmit message information from the sending mobile 50 to the recipient mobile 52. In this embodiment, sending mobile 50 transmits the predefined messages by code to server 48, which decodes the code and transmits the textual information to recipient mobile 52. The predefined messages are programmed into the server to correspond to the predefined messages stored in all mobiles operating in the system. For example, if the user selects predefined message No. 2 from message list 10 to be transmitted in language A from the list of available language translations 12, sending mobile 50 transmits the code "2, A" along with the recipient's telephone number to server 48. Server 48 is preprogrammed to decode "2, A" into the message "please contact the office" in English for transmission to recipient mobile 52. In this embodiment, all mobiles sending messages are operated through intermediate server 48, thereby reducing the amount of data that must be transmitted from the sending mobile 50 to server 48. Mobiles receiving messages may optionally be operated through intermediate server 48. In this embodiment, customizable messages are also transmitted according to a message and language code, along with the information input by the user into the customizable locations of the customizable message.

Figure 4:
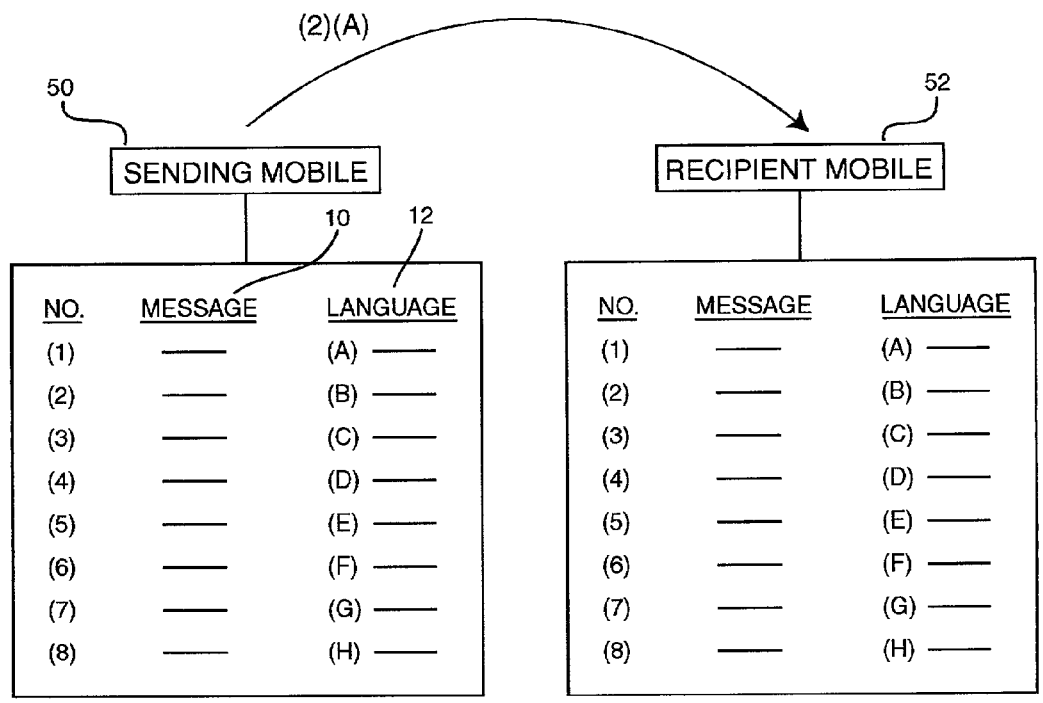
FIG. 4 is a diagram depicting a list of predefined messages, available translation languages, and the third embodiment of transmission methodology of the present invention.

In a third embodiment of the transmission methodology of the present invention, similar to the second embodiment, all mobiles operate in a closed system. Referring to FIG. 4, a diagram depicts a list of predefined messages 10, available translation languages 12, and the closed mobile communication system through which the messaging system is implemented. In this embodiment, all mobiles are programmed with the same messages 10 and language translations 12. Messages are transmitted directly from sending mobile 50 to recipient mobile 52 with a minimal amount of data bits because all predefined messages are identical and are identically coded.

In the simplest example, referring to FIG. 4, if the user chooses to send predefined message No. 2 in language A, sending mobile 50 transmits the code "2, A" to recipient mobile 52, which then displays predefined message No. 2 in language A to the recipient. Optionally, default information and defined contacts/text lists are also identical on each mobile in the system, and each piece of information is coded identically. Then, should the user of sending mobile 50 select a customizable message such as message No. 5 (see also FIG. 3), in language B, sending mobile 50 transmits the message code "5, B" along with the code for the customized defined or default information input by the user of sending mobile 50 into the customizable locations in the customizable message. The second and third embodiments of the transmission methodology depicted in FIG. 3 and FIG. 4 are particularly applicable to closed mobile communication systems such as when all mobile users are within a single business environment where mobile users communicate with a common and familiar set of messages.

It will be understood that information such as the predefined message list 10 and the defined contacts/text list 14 can be downloaded from another system, such as a computer, the Internet, or a personal digital assistant (PDA). While simplified examples are depicted in the figures showing the preferred embodiments of the present invention, it will be understood by those skilled in the art that a variety of modifications to the system as depicted are within the teachings of the present invention.

Although the invention has been described in detail with particular reference to these preferred embodiments, other embodiments can achieve the same results. Variations and modifications of the present invention will be obvious to those skilled in the art, and the appended claims are intended to cover all such modifications and equivalents.

What is claimed is:

1. A method of message communication between a first and a second wireless communication device, the method comprising the steps of:

storing a plurality of predefined messages in a memory of the first and the second wireless communication devices, each predefined message of the plurality of predefined messages associated with a message number code of a plurality of message number codes and a language code of a plurality of language codes;

selecting a predefined message of the plurality of predefined messages to send to at least one recipient, the selected predefined message having an associated message number code of the plurality of message number codes;

selecting a language for the selected predefined message, the selected language having a selected language code of the plurality of language codes; and transmitting the associated message number code and the selected language code from the first wireless communication device to the second wireless communication device, the selected language code being used to retrieve the predefined message in the selected language from the memory of the second wireless communication device.

2. The method of claim 1 further comprising:
receiving the associated message number code and the selected language code at a server;
the server constructing a text message from the associated message number code and the selected language code; and
sending the constructed text message to the second wireless communication device.

3. The method of claim 1 further comprising the steps of:
storing a defined contacts list of message recipients in the memory of the first wireless communication device;
selecting the at least one recipient from the defined contacts list of message recipients.

4. The method of claim 1 wherein the plurality of predefined messages comprises at least one customizable concatenated message, the at least one customizable concatenated message comprising at least one customizable text entry portion.

5. The method of claim 4 wherein the at least one customizable text entry portion comprises user-input text information.

6. The method of claim 4 wherein the at least one customizable text entry portion comprises selectable text information.

7. The method of claim 4 wherein the at least one customizable text entry portion comprises default information.

8. The method of claim 7 wherein the default information comprises at least one of information from a calendar and information from a clock.

9. The method of claim 4 wherein the at least once customizable text entry portion comprises defined information.

10. The method of claim 9 wherein the defined information comprises at least one of recipient contact information, terms previously stored in the memory of the first wireless communication device, and phrases previously stored in the memory of the first wireless communication device.

11. A method of message communication between first and second wireless devices, the method comprising the steps of:
selecting a predefined message from a plurality of predefined messages stored in a memory of the first wireless device, the predefined message identifiable by a message code;
selecting a preferred language code; and
transmitting a transmit message comprising the message code and the preferred language code to the second wireless device, the preferred language code and the message code being used to retrieve a corresponding selected predefined message from a memory of the second wireless communication device.

12. The method of claim 11 wherein the plurality of predefined messages comprises at least one customizable message having a predefined portion and at least one customizable text entry portion.

13. The method of claim 11 further comprising:
intercepting the transmit message at a server;
constructing a text message from the transmit message based upon the message code and the preferred language code; and
forwarding the text message from the server to the the second wireless device.

14. A device for wireless message communication, the device comprising:
a memory comprising:
contact information for a plurality of recipients; and
a plurality of predefined messages for transmission, each predefined message of the plurality of predefined messages associated with a message code and a transmission language code;
a user interface for selecting at least one recipient of the plurality of recipients and for selecting a predefined message of the plurality of predefined messages;
a processor for coding the selected predefined message into a coded message, the coded message comprising the message code and the transmission language code; and
a transceiver for transmitting the coded message to the selected at least one recipient, the at least one recipient having a wireless device with a memory for retrieving a message corresponding to the selected predefined message using the message code and the transmitted language code.

15. The device of claim 14, wherein at least one predefined message of the plurality of predefined messages is a customizable message, the customizable message comprising at least one customizable text entry portion.

16. The device of claim 15 wherein the customizable text entry portion comprises at least one of user-input text information, default information, and defined information.

17. The device of claim 16 wherein the default information comprises time and date information.

18. The device of claim 16 wherein the defined information comprises predefined phrases stored in the memory.

19. The device of claim 14 wherein the user interface is used to select a preferred language of the at least one recipient, wherein the preferred language is associated with the transmission language code.

20. A system for message communication between first and second wireless communication devices, the system comprising:
the first and the second wireless communication devices comprising:
a memory for storing contact information for at least one other wireless communication devices and for storing a plurality of predefined messages, each predefined message of the plurality of predefined messages identifiable by a message code and a language code;
a user interface for selecting a predefined message of the plurality of predefined messages on the first wireless communication device, for selecting the contact information, and for selecting a transmission language;
a processor for preparing a coded predefined message comprising an associated message code associated with the selected predefined message and an associated language code associated with the selected transmission language; and
a transceiver for transmitting the coded predefined message; and
a network server for receiving the coded predefined message and sending the coded predefined message to the second wireless communication device, the second wireless communication device retrieving a corresponding predefined message from the memory using the transmitted associated message code and the transmitted associated language code.

21. The system of claim 20 wherein the plurality of predefined messages comprises a plurality of customizable messages having a predefined portion and at least one customizable text entry portion.

22. The system of claim 21 wherein the at least one customizable text entry portion comprises user-input text information.

23. The system of claim 21 wherein the at least one customizable text entry portion comprises selectable text information.

24. The system of claim 21 wherein the at least one customizable text entry portion comprises default information.

25. The system of claim 20 wherein the network server constructs a text message from the coded predefined message and sends the constructed text message to the second wireless communication device.

* * * * *